US012781844B2

(12) United States Patent
Iwabuchi et al.

(10) Patent No.: US 12,781,844 B2
(45) Date of Patent: Nov. 3, 2026

(54) TRAVELING DEVICE FOR WHEELED VEHICLE

(71) Applicant: Hitachi Construction Machinery Co., Ltd., Tokyo (JP)

(72) Inventors: Yuutarou Iwabuchi, Ushiku (JP); Shinichiro Hagihara, Tsuchiura (JP); Takahiro Sato, Ami-machi (JP); Akinori Kondo, Tsukuba (JP); Rio Kawada, Tsuchiura (JP); Yoko Miyahara, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 310 days.

(21) Appl. No.: 18/695,910

(22) PCT Filed: Mar. 23, 2023

(86) PCT No.: PCT/JP2023/011515
§ 371 (c)(1),
(2) Date: Mar. 27, 2024

(87) PCT Pub. No.: WO2023/190036
PCT Pub. Date: Oct. 5, 2023

(65) Prior Publication Data

US 2025/0003481 A1 Jan. 2, 2025

(30) Foreign Application Priority Data

Mar. 30, 2022 (JP) ................................ 2022-054915

(51) Int. Cl.
*F16H 57/04* (2010.01)
*B60K 6/36* (2007.10)
(Continued)

(52) U.S. Cl.
CPC ....... *F16H 57/0423* (2013.01); *B60K 7/0007* (2013.01); *B60K 17/043* (2013.01);
(Continued)

(58) Field of Classification Search
CPC . F16H 57/0423; B60K 7/0007; B60K 17/043; B60K 6/36; B60K 6/46;
(Continued)

(56) References Cited

U.S. PATENT DOCUMENTS 4,693,699 A * 9/1987 Gregerson ............... F16J 15/54 277/912
5,372,213 A * 12/1994 Hasebe .................... B60K 1/02 184/6.12

(Continued)

FOREIGN PATENT DOCUMENTS

JP 52-168143 U 12/1977
JP 55-181025 U 12/1980

(Continued)

OTHER PUBLICATIONS

International Search Report (PCT/ISA/210) issued in PCT Application No. PCT/JP2023/011515 dated May 30, 2023 with partial English translation (6 pages).

(Continued)

*Primary Examiner* — Jacob B Meyer
(74) *Attorney, Agent, or Firm* — Crowell & Moring LLP

(57) ABSTRACT

A traveling device (11) includes a cylindrical spindle (12) that rotatably supports a wheel attaching cylinder (17) to which a wheel (7) is attached, an electric motor (13) attached to the spindle (12), a motor shaft (14) that projects from the electric motor (13) and outputs rotation of the electric motor (13), a rotation shaft (15) to which the rotation of the motor shaft (14) is transmitted, a gear reduction mechanism (21) that decelerates rotation of the rotation shaft (15) and
(Continued)

transmits the decelerated rotation to the wheel attaching cylinder (17), a lubricating oil circulation circuit (50) that repeatedly supplies lubricating oil (L) to the gear reduction mechanism (21), and a coupling (38) disposed for the joint between the motor shaft (14) and the rotation shaft (15). A lubricating oil passage (43) is disposed in the coupling (38), and the lubricating oil passage (43) supplies part of the lubricating oil (L), which is supplied to the gear reduction mechanism (21) by using the lubricating oil circulation circuit (50), to a coupling section between the motor shaft (14) and the coupling (38).

3 Claims, 7 Drawing Sheets

(51) Int. Cl.

| | |
|---|---|
| ***B60K 6/46*** | (2007.10) |
| ***B60K 7/00*** | (2006.01) |
| ***B60K 17/04*** | (2006.01) |
| ***F16D 1/10*** | (2006.01) |

(52) U.S. Cl.

CPC .................. *F16D 1/10* (2013.01); *B60K 6/36* (2013.01); *B60K 6/46* (2013.01); *B60K 2007/0061* (2013.01); *B60Y 2200/92* (2013.01); *F16D 2001/103* (2013.01); *F16D 2300/06* (2013.01)

(58) Field of Classification Search

CPC ............... B60K 2007/0061; F16D 1/10; F16D 2001/103; F16D 2300/06; B60Y 2200/92

See application file for complete search history.

(56) References Cited

U.S. PATENT DOCUMENTS 6,223,616 B1 * 5/2001 Sheridan ............... F16H 1/2827 184/6.12
8,100,806 B2 * 1/2012 Shibukawa ......... F16H 57/0482 475/159
9,500,273 B2 * 11/2016 Suzuki ................ F16H 57/0412
11,279,220 B2 * 3/2022 Hagihara ................ F16D 1/101
11,413,946 B2 * 8/2022 Absenger .............. F16H 57/045
11,821,494 B2 * 11/2023 Nagumo ............... F16H 15/503
11,827,092 B2 * 11/2023 Roper ....................... B60T 1/06
2011/0200282 A1 * 8/2011 Shinohara ............ B60K 17/046 384/462
2012/0329596 A1 * 12/2012 Nomura .................... F16H 1/32 475/159
2013/0065722 A1 * 3/2013 Nomura .............. F16H 57/0428 475/159
2020/0016973 A1 * 1/2020 Hagihara ................ F16H 57/04
2025/0003481 A1 * 1/2025 Iwabuchi ............. B60K 17/046
2025/0007353 A1 * 1/2025 Verhoog ................. F16C 25/06

FOREIGN PATENT DOCUMENTS

| | | | | | | |
|---|---|---|---|---|---|---|
| JP | 4-298647 | A | | 10/1992 | | |
| JP | H04298647 | A | * | 10/1992 | | |
| JP | 2007-2919 | A | | 1/2007 | | |
| JP | 2007016906 | A | * | 1/2007 | ......... | F16H 57/0482 |
| JP | 2007139128 | A | * | 6/2007 | ......... | F16H 57/0482 |
| JP | 2013060985 | A | * | 4/2013 | ......... | F16H 57/0479 |
| JP | 2013194857 | A | * | 9/2013 | | |
| JP | 2015218865 | A | * | 12/2015 | | |
| JP | 2016-97771 | A | | 5/2016 | | |
| JP | 2019-2419 | A | | 1/2019 | | |
| JP | 2019002419 | A | * | 1/2019 | ........... | B60K 7/0007 |
| WO | WO-2009016884 | A1 | * | 2/2009 | ............. | B60B 25/04 |
| WO | WO-2018230270 | A1 | * | 12/2018 | ........... | B60K 7/0007 |
| WO | WO-2024070242 | A1 | * | 4/2024 | .............. | B60T 1/062 |

OTHER PUBLICATIONS

Japanese-language Written Opinion (PCT/ISA/237) issued in PCT Application No. PCT/JP2023/011515 dated May 30, 2023 with English translation (6 pages).

* cited by examiner

TRAVELING DEVICE FOR WHEELED VEHICLE

TECHNICAL FIELD

The present invention relates to a traveling device that is used suitably for a wheeled vehicle having wheels, such as a dump truck, for example.

BACKGROUND ART

A traveling device that is disposed in a wheeled vehicle, for example, a dump truck is provided with a cylindrical spindle that is disposed in a vehicle body and rotatably supports a rim to which a wheel is attached, an electric motor attached to the spindle, a motor shaft for outputting rotation of the electric motor, a rotation shaft that is disposed in such a manner as to axially extend on an inner peripheral side of the spindle and to which the rotation of the motor shaft is transmitted, a gear reduction mechanism that decelerates the rotation of the rotation shaft and transmits the decelerated rotation to the rim, and a coupling for joint between the motor shaft and the rotation shaft.

Since an axial length dimension of the rotation shaft is large and a weight of a dump truck is large, when the rotation of the motor shaft is transmitted to the gear reduction mechanism by the rotation shaft, misalignment due to deflection possibly occurs in the rotation shaft. For allowing the misalignment of the rotation shaft, a coupling is disposed between the rotation shaft and the motor shaft to provide spline coupling between the rotation shaft and the coupling and between the motor shaft and the coupling respectively.

A spline coupling section of the two shafts jointed by the spline coupling is usually lubricated by a lubricant. For example, Patent Document 1 discloses a traveling device in which a motor rotation shaft and a gear reducer input shaft are jointed by spline coupling and a lubricant filled in this spline coupling section is sealed by a sealing material of an O-ring or the like.

PRIOR ART DOCUMENT

Patent Document

Patent Document 1: Japanese Patent Laid-Open No. 2016-97771 A

SUMMARY OF THE INVENTION

However, in the traveling device according to Patent Document 1, the lubricant filled in the spline coupling section between the motor rotation shaft and the gear reducer input shaft is sealed by using the sealing material. Therefore, there is a problem that the lubricant is degraded to deteriorate the lubricating performance. In addition, there is a problem that since the abrasion is suppressed from being promoted by the abrasion powder having remained in the spline coupling section, a work for replacing the lubricant periodically (grease feeding work) becomes necessary.

On the other hand, it is considered to render the lubrication to the coupling section unnecessary by using a key for the joint of the two shafts. However, in a case of jointing the two shafts by using the key, the joint accuracy is ensured by the fitting of the key. Therefore, there is a problem that as compared to the spline the coupling, workability at the time of disassembling/assembling the two shafts deteriorates and a shaft diameter (diameter) of two shafts to be jointed becomes large.

An object of the present invention is to provide a traveling device for wheeled vehicle that can appropriately lubricate a coupling section between a motor shaft and a coupling.

An aspect of the present invention is applied to a traveling device for wheeled vehicle comprising: a cylindrical spindle that is disposed on a vehicle body in a wheeled vehicle and rotatably supports a wheel attaching cylinder to which a wheel is attached; an electric motor attached to the spindle; a motor shaft that projects from the electric motor to output rotation of the electric motor; a rotation shaft that is disposed in such a manner as to axially extend on an inner peripheral side of the spindle and to which rotation of the motor shaft is transmitted; a gear reduction mechanism that decelerates the rotation of the rotation shaft and transmits the decelerated rotation to the wheel attaching cylinder; a lubricating oil circulation circuit for supplying lubricating oil to the gear reduction mechanism, and a coupling for joint between the motor shaft and the rotation shaft, characterized by including a coupling section lubricating circuit for supplying, a part of the lubricating oil produced by split-flowing the lubricating oil to be supplied to the gear reduction mechanism from the lubricating oil circulation circuit, through the inside of the coupling to a coupling section between the motor shaft and the coupling.

According to the aspect of the present invention, the part of the lubricating oil flowing in the lubricating oil circulation circuit can be supplied through the coupling section lubricating circuit to the coupling section between the motor shaft and the coupling to appropriately lubricate the motor shaft and the coupling.

BRIEF DESCRIPTION OF THE DRAWINGS

FIG. 5 is an enlarged view of an essential part showing an essential part of the coupling, a lubricating oil passage, the coupling housing, a supply oil passage, a discharge oil passage and the like.

MODE FOR CARRYING OUT THE INVENTION

Hereinafter, a traveling device for wheeled vehicle according to an embodiment of the present invention will be in detail explained with reference to the accompanying drawings by taking a case of being applied to a dump truck of a rear drive system as an example.

Figure 1:
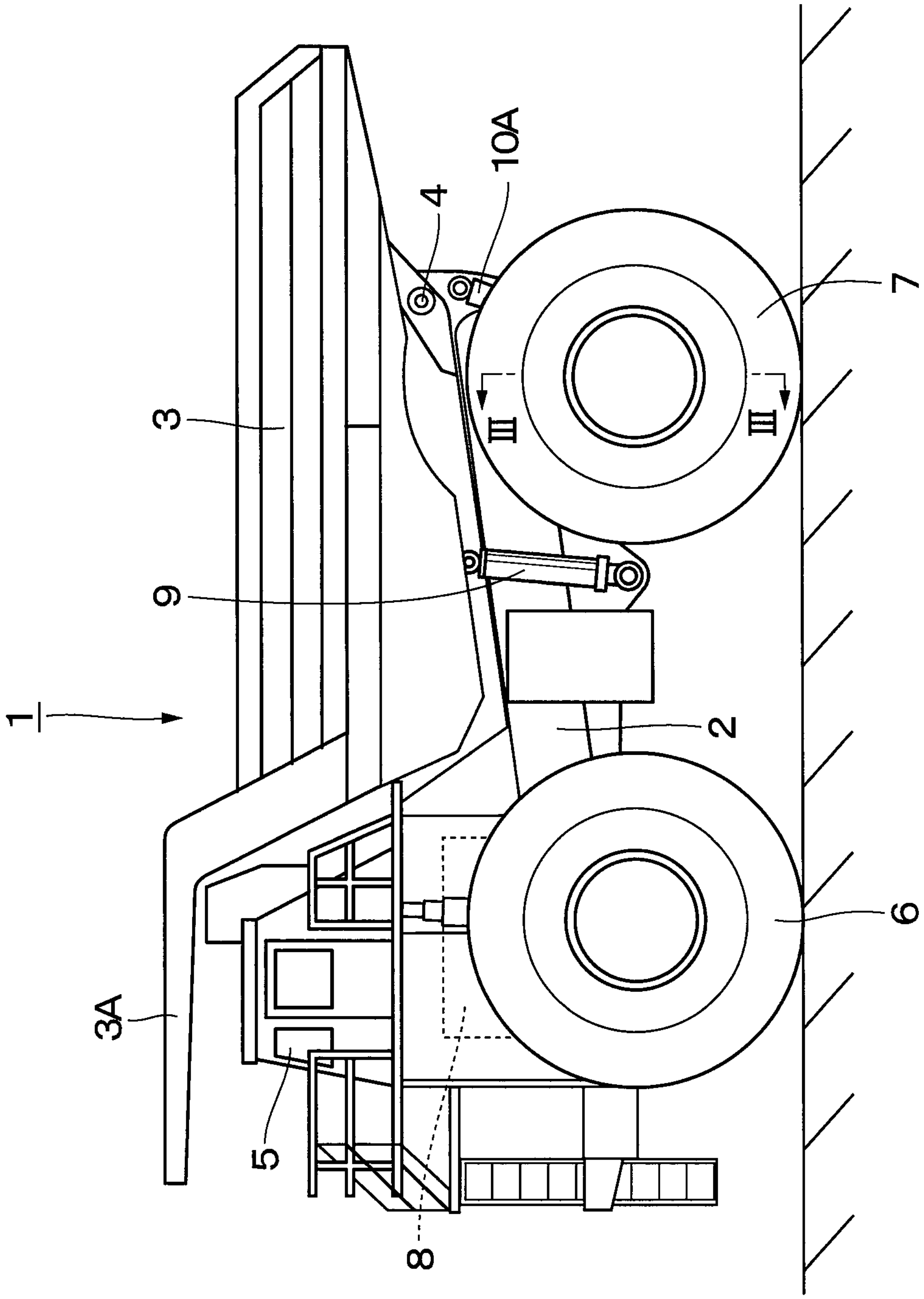
FIG. 1 is a left side view showing a dump truck to which a traveling device according to an embodiment of the present invention is applied.
Figure 2:
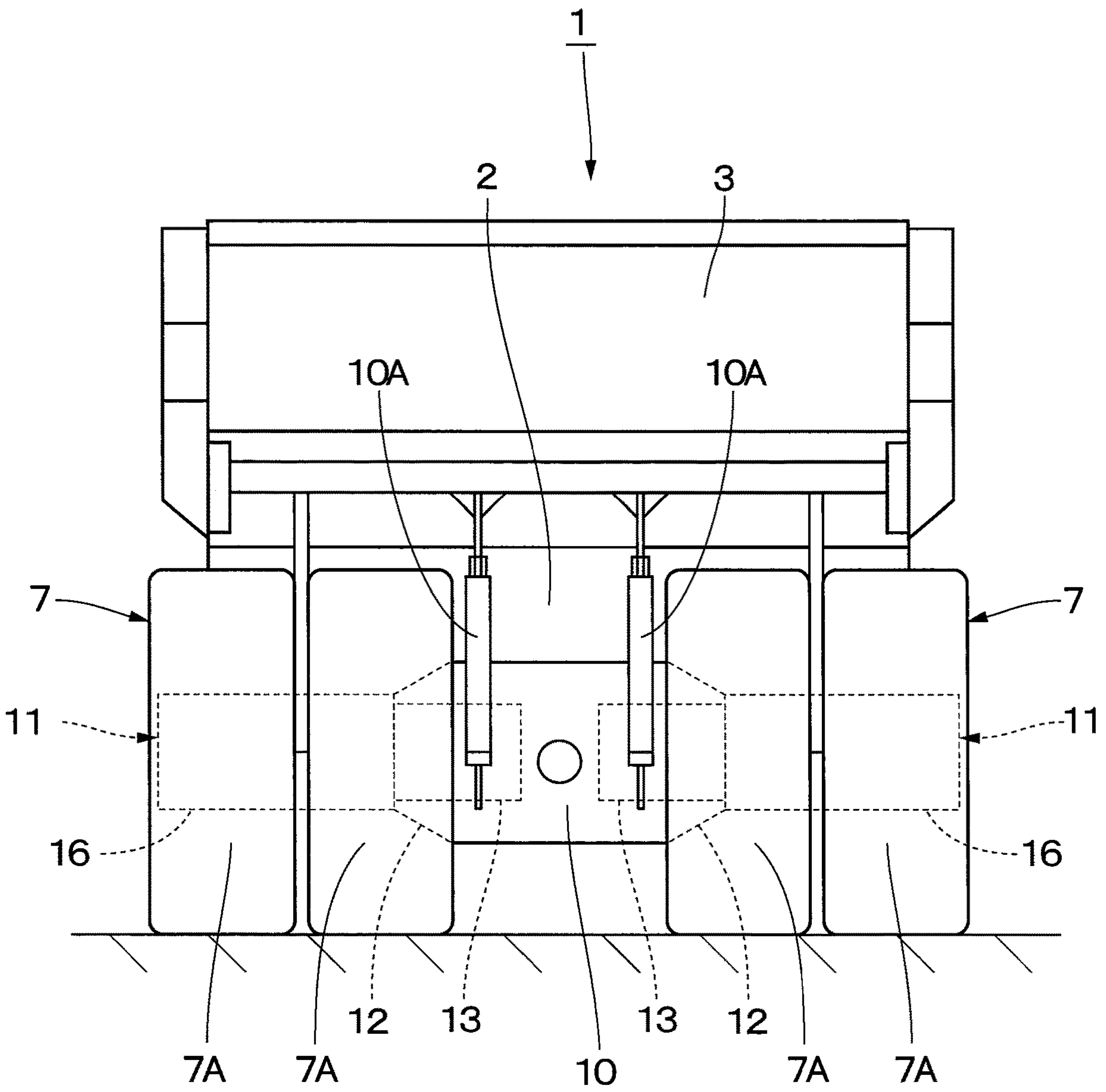
FIG. 2 is a rear view showing the dump truck, as viewed from the backside.

In FIG. 1, a dump truck 1 is provided with a vehicle body 2 having a strong frame structure, a vessel (loading platform) 3 mounted on the vehicle body 2 to be capable of lifting and tilting, a cab 5 disposed in the front part of the vehicle body 2 and left and right front wheels 6 and left and right rear wheels 7 as wheels.

The vessel 3 is formed as a large-sized container for loading heavy baggage such as crushed stones. A rear-side bottom part of the vessel 3 is coupled to a rear end side of the vehicle body 2 through a coupling pin 4 and the like to be capable of lifting and tilting (inclination-rotating). In addition, a protector 3A is integrally disposed on a front-side upper part of the vessel 3 in such a manner as to cover the cab 5 from the upper side. The cab 5 is disposed in the front part of the vehicle body 2 to be positioned under the protector 3A. The cab 5 forms an operator's room. An operator's seat, a handle for steering, a plurality of control levers (none of them are shown) and the like are arranged inside the cab 5.

Figure 3:
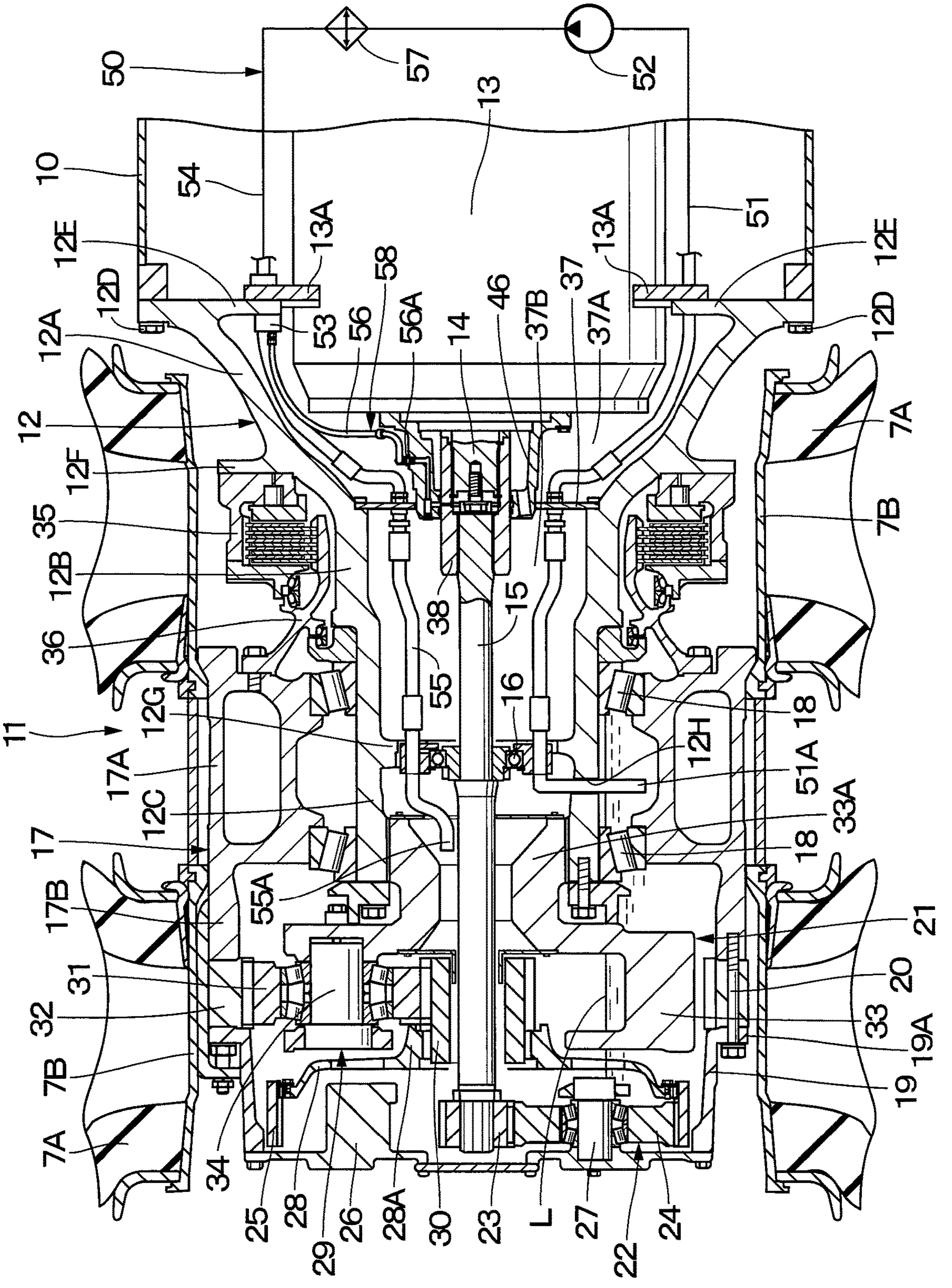
FIG. 3 is a cross section showing a traveling device on the rear wheel side, as viewed in a direction of arrows III-III in FIG. 1.
Figure 4:
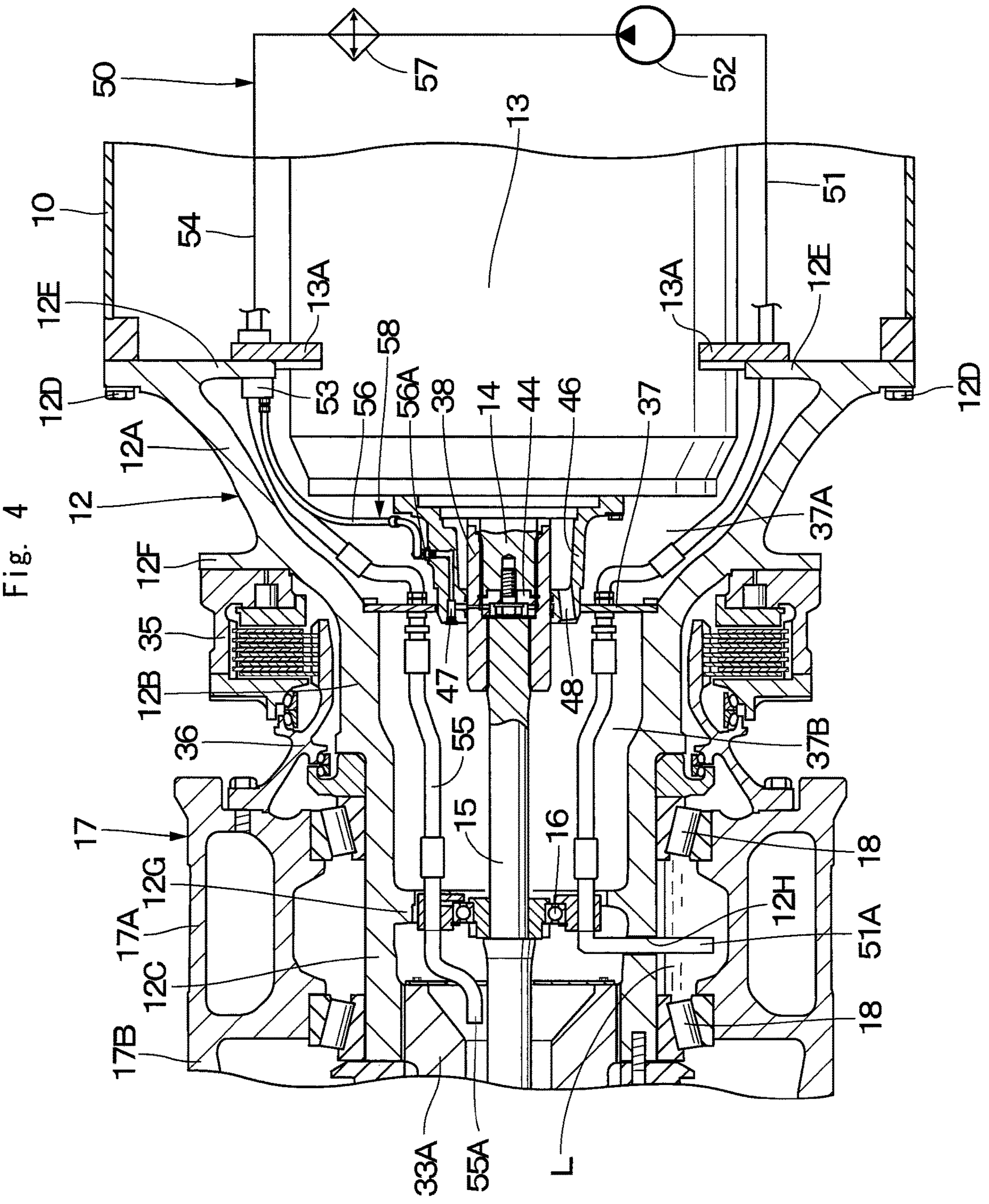
FIG. 4 is an enlarged view showing a motor shaft, a rotation shaft, a coupling, a coupling housing and the like in FIG. 3.

The left and right front wheels 6 are rotatably arranged on the front side of the vehicle body 2 (the left wheel only is shown). The left and right front wheels 6 form steered wheels that are steered by an operator. The left and right rear wheels 7 are rotatably arranged on the rear side of the vehicle body 2. The left and right rear wheels 7 form drive wheels of the dump truck 1 and are driven and rotated integrally with a wheel attaching cylinder 17 by a traveling device 11 as shown in FIG. 3. The rear wheel 7 includes two rows of tires 7A composed of dual tires and a rim 7B located in a radial inside of the tire 7A.

An engine 8 is positioned under the cab 5 to be disposed within the vehicle body 2. The engine 8 is configured by, for example, a diesel engine or the like, and drives an electric motor 13, a hydraulic pump (not shown), which will be described later, and the like for rotation, which are mounted on the vehicle body 2. Pressurized oil delivered from the hydraulic pump is supplied to hoist cylinders 9, a steering cylinder for power steering (not shown) and the like.

The hoist cylinders 9 are disposed between the vehicle body 2 and the vessel 3. The hoist cylinders 9 are positioned between the front wheel 6 and the rear wheel 7 to be located on both left and right sides of the vehicle body 2. Each of the hoist cylinders 9 expands and contracts in the upper-lower direction by delivery/suction of the pressurized oil from/to the hydraulic pump to lift and tilt (inclination-rotate) the vessel 3 around the coupling pin 4.

An axle housing 10 on the rear wheel side is disposed on a rear side of the vehicle body 2. The axle housing 10 is formed as a hollow cylindrical body that extends in the left-right direction. The axle housing 10 is attached through left and right rear-wheel side suspension 10A to the rear side of the vehicle body 2. The traveling devices 11 for driving the left and right rear wheels 7 are disclosed to both left and right sides of the axle housing 10 respectively.

The traveling device 11 is disposed on each of both left and right sides of the axle housing 10. As shown in FIG. 3, the traveling device 11 includes a spindle 12, the electric motor 13, a rotation shaft 15, the wheel attaching cylinder 17, a gear reduction mechanism 21, a coupling 38, a coupling housing 46, and a lubricating oil circulation circuit 50. The traveling device 11 decelerates rotation of the rotation shaft 15 by the gear reduction mechanism 21 and drives the left and right rear wheels 7 as drive wheels by a large rotational torque for rotation.

The spindle 12 is disposed on each of both left and right sides of the axle housing 10. The spindle 12 is formed in a stepped cylindrical shape axially (in the left-right direction) extending and includes a tapered part 12A, an intermediate cylindrical part 12B and a small-diameter cylindrical part 12C. The tapered part 12A is formed in a tapered shape to gradually reduce in diameter from an axial one side (axle housing 10-side) toward an axial other side of the spindle 12 and is attached to an end part of the axle housing 10 by using a plurality of bolts 12D. The intermediate cylindrical part 12B is formed integrally with a diameter-reduced side of the tapered part 12A to axially extend. The small-diameter cylindrical part 12C has an outer diameter dimension smaller than the intermediate cylindrical part 12B and is formed integrally with a tip end side of the intermediate cylindrical part 12B.

A plurality of motor attaching seatings 12E projecting to a radial inside are disposed on an axial one side of the tapered part 12A and the electric motor 13 is attached to the motor attaching seating 12E. An annular flange part 12F projecting to a radial outside is disposed on an outer peripheral side of the tapered part 12A and an after-mentioned wet type brake 35 is attached to the flange part 12F.

On the other hand, a tip end of the small-diameter cylindrical part 12C is formed as an open end, and a cylindrical projection part 33A of an after-mentioned second-stage carrier 33 is spline-coupled to an inner peripheral side of the small-diameter cylindrical part 12C. An annular inner-side projection part 12G projecting to a radial inside is formed integrally with an inner peripheral side of an axial intermediate part of the small-diameter cylindrical part 12C and an after-mentioned bearing 16 is attached to the inner-side projection part 12G. Further, a radial hole 12H is drilled on a lower side of the small-diameter cylindrical part 12C to penetrate therethrough in the upper-lower direction (in a radial direction of the small-diameter cylindrical part 12C), and a tip end 51A of an after-mentioned suction pipe 51 is inserted in the radial hole 12H.

The electric motor 13 for travel is located in the axle housing 10 and in the tapered part 12A of the spindle 12. A plurality of attachment flanges 13A are arranged on an outer peripheral side of the electric motor 13, and the attachment flanges 13A are attached to the motor attaching seatings 12E of the spindle 12 (tapered part 12A) by using bolts or the like.

Figure 5:
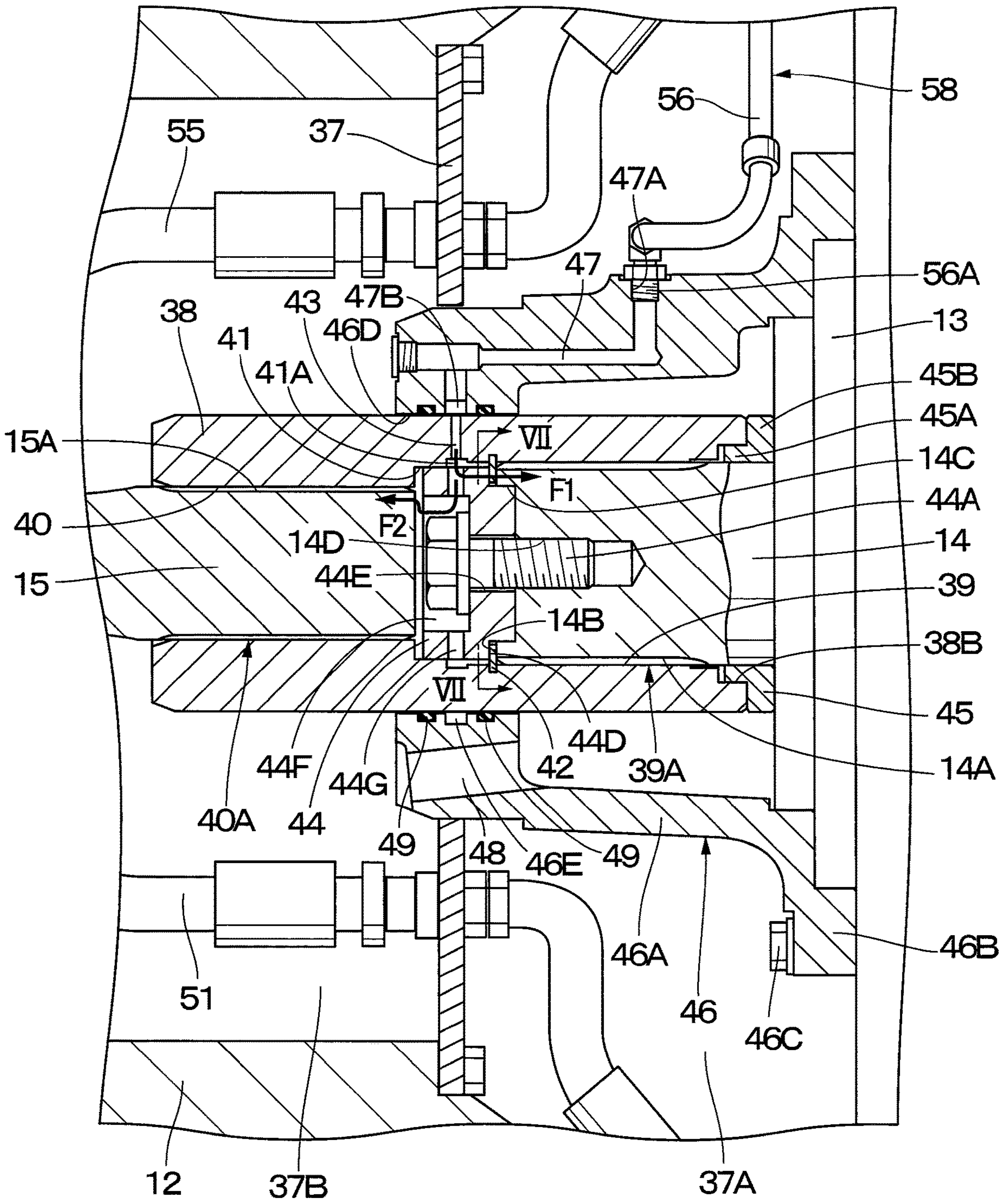
Figure 6:
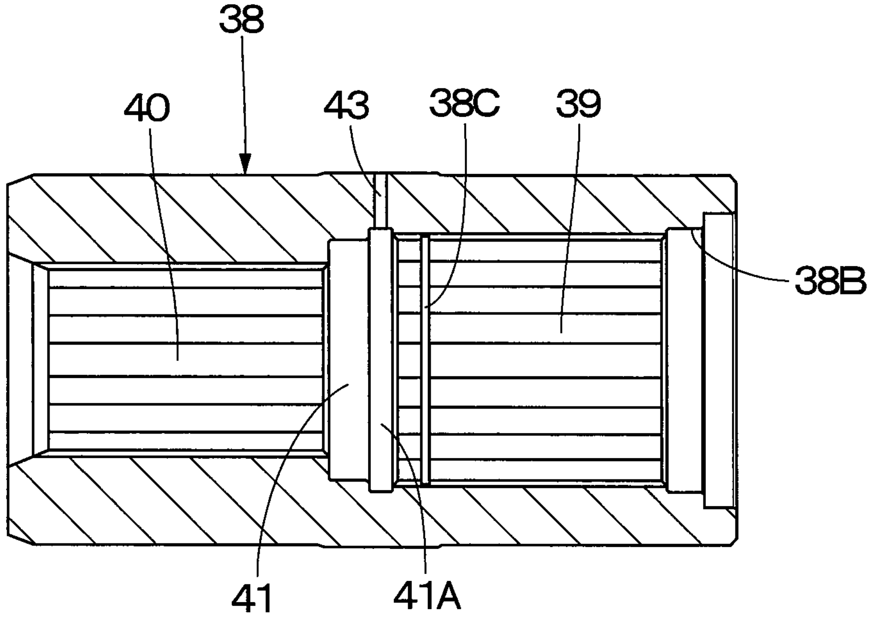
FIG. 6 is a cross section showing the coupling as a single unit.
Figure 8:
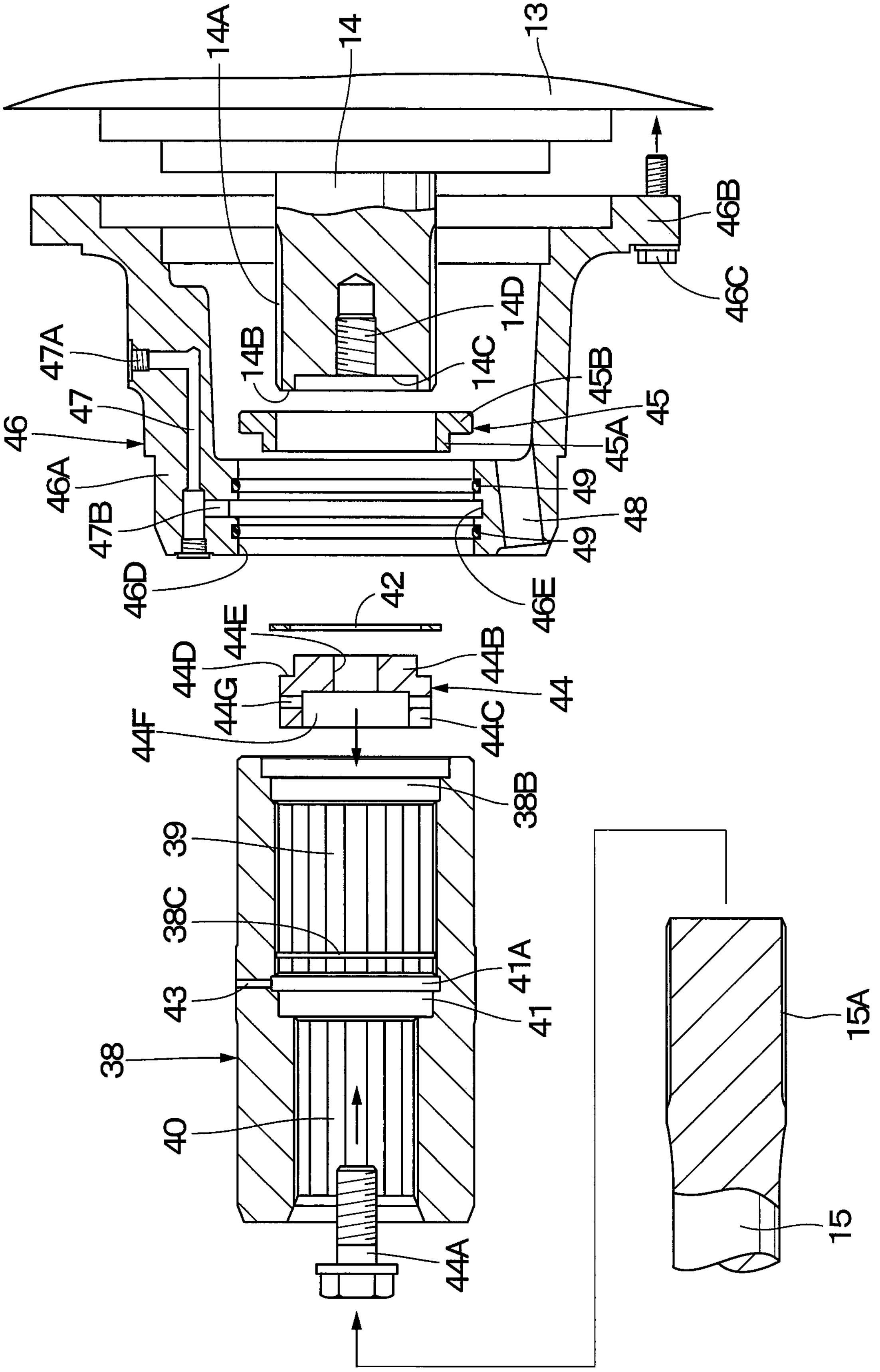
FIG. 8 is an exploded view showing a state where the motor shaft, the rotation shaft, the coupling, the coupling housing, a stopper and the like are exploded.

A motor shaft 14 projects from the electric motor 13. The electric motor 13 drives the motor shaft 14 for rotation by supply of electric power from a power generator (not shown) mounted on the vehicle body 2 to transmit the rotation of the motor shaft 14 to the rotation shaft 15. As shown in FIG. 5 and FIG. 8 a motor shaft spline part 14A in which a spline groove is disposed is formed on an outer peripheral surface of the motor shaft 14, and the motor shaft spline part 14A is engaged to a motor shaft-side hole spline part 39 of the after-mentioned coupling 38. A bottomed stopper attaching hole 14C is disposed in a projection end 14B of the motor shaft 14, and a bolt hole (female screw hole) 14D is formed in the center of a bottom of the stopper attaching hole 14C.

The rotation shaft 15 is disposed on an inner peripheral side of the spindle 12 to axially extend therein. The rotation shaft 15 is formed by a single long bar-shaped body. A rotation shaft spline part 15A is formed on an outer peripheral surface of one end side of the rotation shaft 15 (electric motor 13-side), and the rotation shaft spline part 15A is engaged to a rotation shaft-side hole spline part 40 of the after-mentioned coupling 38. In this way, the rotation shaft 15 is jointed via the coupling 38 to the motor shaft 14 of the electric motor 13 and is driven and rotated by the electric motor 13. The other end side of the rotation shaft 15 projects from the open end of the small-diameter cylindrical part 12C of the spindle 12. An after-mentioned sun gear 23 is attached to the other end (projection end) of the rotation shaft 15. The axial intermediate part of the rotation shaft 15 is rotatably supported by the bearing 16 attached on the inner-side projection part 12G of the spindle 12.

The wheel attaching cylinder 17 is rotatably disposed via two roller bearings 18 on an outer peripheral side of the small-diameter cylindrical part 12C configuring part of the spindle 12. The wheel attaching cylinder 17 is supported by the two roller bearings 18 and includes a hollow cylindrical part 17A axially extending on the outer peripheral side of the small-diameter cylindrical part 12C and an extension cylindrical part 17B that projects axially from a tip end of the hollow cylindrical part 17A and extends in a direction away from the spindle 12. The cylindrical rim 7B configuring part of the rear wheel 7 is removably attached to the outer peripheral side of the wheel attaching cylinder 17, and the rear wheel 7 rotates integrally with the wheel attaching cylinder 17. An after-mentioned internal gear 32 and an outer drum 19 are fixed integrally to an end part of the extension cylindrical part 17B of the wheel attaching cylinder 17 by using elongated bolts 20. The outer drum 19 is composed of a cylindrical body, and a flange part 19A disposed on an axial one side of the outer drum 19 is fixed via the internal gear 32 to the wheel attaching cylinder 17. An axial other side of the outer drum 19 is formed as an open end.

The gear reduction mechanism 21 is disposed between the rotation shaft 15 and the wheel attaching cylinder 17. The gear reduction mechanism 21 is configured by a first-stage planetary gear reduction mechanism 22 and a second-stage planetary gear reduction mechanism 29. The gear reduction mechanism 21 decelerates the rotation of the rotation shaft 15 by two stages, which is transmitted to the wheel attaching cylinder 17.

The first-stage planetary gear reduction mechanism 22 includes a sun gear 23, a plurality of planetary gears 24 and a carrier 26. The sun gear 23 is spline-coupled to a tip end of the rotation shaft 15 projecting from the spindle 12 (small-diameter cylindrical part 12C). The plurality of planetary gears 24 are engaged to the sun gear 23 and a ring-shaped internal gear 25 and rotate and revolve around the sun gear 23. The carrier 26 is fixed on an open end of the outer drum 19 integral with the wheel attaching cylinder 17 by bolts or the like and rotatably supports the plurality of planetary gears 24 through support pins 27.

Here, the internal gear 25 is formed by using a ring gear to surround the sun gear 23 and the plurality of planetary gears 24 from a radial outside. The internal gear 25 is relatively rotatably located through a radial gap to an inner peripheral surface of the outer drum 19. The rotation of the internal gear 25 is transmitted through a coupling 28 to the second-stage planetary gear reduction mechanism 29.

The coupling 28 is disposed in a position between the first-stage planetary gear reduction mechanism 22 and the second-stage planetary gear reduction mechanism 29. The coupling 28 is formed in a disc shape with a boss 28A in the center part. An outer peripheral side of the coupling 28 is spline-coupled to the first-stage internal gear 25. An inner peripheral side of the boss 28A in the coupling 28 is spline-coupled to an after-mentioned second-stage sun gear 30. The coupling 28 transmits rotation of the first-stage internal gear 25 to the second-stage sun gear 30 to rotate the sun gear 30 integrally with the first-stage internal gear 25.

As the sun gear 23 is rotated integrally with the rotation shaft 15 by the electric motor 13, the first-stage planetary gear reduction mechanism 22 converts the rotation of the sun gear 23 into a rotating movement of the plurality of planetary gears 24 on its axis and a revolving movement thereof. Further, the rotating movement on its axis of the planetary gears 24 is transmitted to the internal gear 25 as the decelerated rotation and the rotation of the internal gear 25 is transmitted through the coupling 28 to the second-stage planetary gear reduction mechanism 29. On the other hand, the revolving movement of the planetary gears 24 is transmitted via the outer drum 19 to the wheel attaching cylinder 17 as rotation of the carrier 26. At this time, since the wheel attaching cylinder 17 rotates integrally with the second-stage internal gear 32, the revolving movement of the planetary gears 24 is controlled to the rotation synchronized with the wheel attaching cylinder 17.

The second-stage planetary gear reduction mechanism 29 includes the cylindrical sun gear 30, a plurality of planetary gears 31, and the carrier 33. The sun gear 30 is spline-coupled to an inner peripheral side of the boss 28A in the coupling 28 and rotates integrally with the coupling 28. The plurality of planetary gears 31 are engaged to the sun gear 30 and the ring-shaped internal gear 32 to rotate and revolve around the sun gear 30. The carrier 33 rotatably supports the planetary gears 31 through support pins 34. A cylindrical projection part 33A in a cylindrical shape is disposed in the center part of the carrier 33 and an outer peripheral side of the cylindrical projection part 33A is spline-coupled to an inner peripheral side of the small-diameter cylindrical part 12C. Here, the second-stage internal gear 32 is formed by using a ring gear surrounding the sun gear 30, the plurality of planetary gears 31, and the like from a radial outside. The internal gear 32 is fixed integrally between the extension cylindrical part 17B in the wheel attaching cylinder 17 and the outer drum 19 by using elongated bolts 20.

In the second-stage planetary gear reduction mechanism 29, when the cylindrical projection part 33A of the carrier 33 is spline-coupled to the small-diameter cylindrical part 12C of the spindle 12, the revolving movement of the planetary gear 31 (rotation of the carrier 33) is restrained. Therefore, when the sun gear 30 rotates integrally with the coupling 28, the second-stage planetary gear reduction mechanism 29 converts rotation of the sun gear 30 into a rotating movement of the planetary gear 31 and transmits the rotating movement of the planetary gear 31 to the second-stage internal gear 32. With this configuration, the internal gear 32 decelerates and rotates, and rotational torque of large output decelerated by two stages in the first-stage planetary gear reduction mechanism 22 and in the second-stage planetary gear reduction mechanism 29 is transmitted to the wheel attaching cylinder 17 to which the internal gear 32 is fixed.

Here, lubricating oil L is stored in the inside of the wheel attaching cylinder 17, and a liquid surface of the lubricating oil L is in a position lower than the lowest part of the small-diameter cylindrical part 12C configuring part of the spindle 12, for example. Therefore, a lower part of the roller bearing 18 is immersed in the lubricating oil L and part of the planetary gear reduction mechanisms 22, 29 is always lubricated by the lubricating oil L. In addition, the lubricating oil L splashed by the planetary gear reduction mechanisms 22, 29 scatters in a mist shape in the spindle 12, which is supplied also to the bearing 16 supporting the rotation shaft 15. As a result, at the operating of the traveling device 11, the resistance against the stirring of the lubricating oil L is made small, making it possible to suppress the energy loss and heat generation of the traveling device 11.

The wet type brake 35 is attached to the flange part 12F of the spindle 12. The wet type brake 35 is configured of a wet multi-plate type of hydraulic brake and applies braking forces to a brake hub 36 attached to the wheel attaching cylinder 17. With this configuration, braking forces are applied to the rotation of the wheel attaching cylinder 17, that is, the rotation of the rear wheel 7.

A partition wall 37 is disposed within the spindle 12. The partition wall 37 is formed by an annual plate body. An outer peripheral side of the partition wall 37 is attached on a boundary part between the tapered part 12A and the intermediate cylindrical part 12B of the spindle 12 by using bolts or the like. The partition wall 37 partitions the inside of the spindle 12 into a motor accommodating space part 37A accommodating the electric motor 13 and a cylindrical space part 37B communicating with the inside of the wheel attaching cylinder 17.

Figure 7:
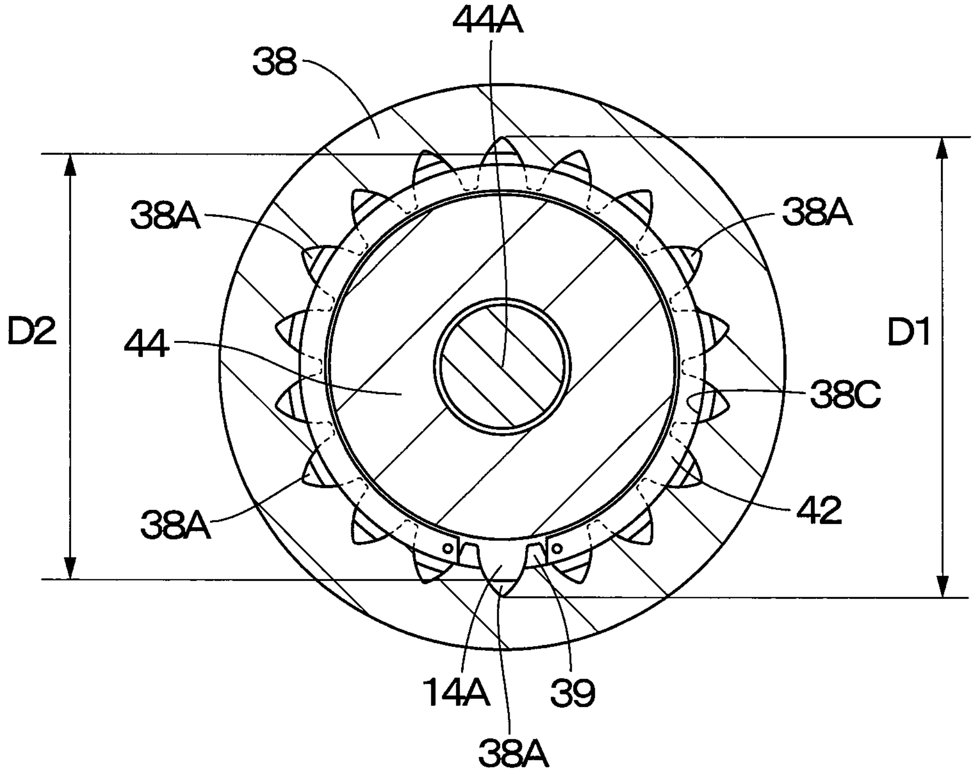
FIG. 7 is a cross section showing a spline coupling section between the motor shaft and the coupling, as viewed in a direction of arrows VII-VII in FIG. 5.

The coupling 38 is located in the center part of the annular partition wall 37 to establish joint between the motor shaft 14 of the electric motor 13 and the rotation shaft 15. As shown in FIG. 5 to FIG. 8, the coupling 38 is formed in a cylindrical shape as a whole and the motor shaft-side hole spline part 39 in which a spline groove is disposed is formed on an inner peripheral surface of an axial one side (motor shaft 14-side) of the coupling 38. The motor shaft-side hole spline part 39 is spline-coupled to the motor shaft spline part 14A of the motor shaft 14. As shown in FIG. 7, a tooth bottom circle diameter D1 of the motor shaft-side hole spline part 39 is set to be larger than a tooth tip circle diameter D2 of the motor shaft spline part 14A (D1>D2). Therefore, gaps 38A are formed between tooth bottoms of a plurality of teeth configuring part of the motor shaft-side hole spline part 39 and tooth tips of a plurality of teeth configuring part of the motor shaft spline part 14A. The gap 38A is formed over an entire region of the spline coupling section 39A in the length direction to which the motor shaft spline part 14A and the motor shaft-side hole spline part 39 are engaged.

A rotation shaft-side hole spline part 40 in which a spline groove is disposed is formed on an inner peripheral surface of an axial other side (rotation shaft 15-side) of the coupling 38. The rotation shaft-side hole spline part 40 is spline-coupled to the rotation shaft spline part 15A of the rotation shaft 15. A tooth bottom circle diameter of the rotation shaft-side hole spline part 40 is set to be larger than a tooth tip circle diameter of the rotation shaft spline part 15A. Therefore, gaps (not shown) are formed between tooth bottoms of a plurality of teeth configuring part of the rotation shaft-side hole spline part 40 and tooth tips of a plurality of teeth configuring part of the rotation shaft spline part 15A. The gap is formed over an entire region of the spline coupling section 40A in the length direction to which the rotation shaft spline part 15A and the rotation shaft-side hole spline part 40 are engaged.

A stopper fitting section 41 is formed on an inner peripheral surface of an axial intermediate part of the coupling 38 to be positioned between the motor shaft-side hole spline part 39 and the rotation shaft-side hole spline part 40. A portion, which is adjacent to the motor shaft-side hole spline part 39, of the stopper fitting section 41 serves as an annular oil passage 41A having an inner diameter dimension larger than the stopper fitting section 41, and an after-mentioned lubricating oil passage 43 opens to the annular oil passage 41A.

A sleeve fitting section 38B is disposed on an end surface of an axial one side of the coupling 38. An after-mentioned sleeve 45 is fitted in the sleeve fitting section 38B. An annular groove 38C is formed over an entire periphery on an inner peripheral surface of the coupling 38 in which the motor shaft-side hole spline part 39 is formed. A C-letter type of a stop ring 42 for hole is attached to the annular groove 38C. As shown in FIG. 7, an outer diameter dimension of the stop ring 42 for hole attached to the annular groove 38C is set to be smaller than the tooth tip circle diameter D2 of the motor shaft spline part 14A spline-coupled to the motor shaft-side hole spline part 39. Therefore, the gap 38A formed between the tooth bottom of the motor shaft-side hole spline part 39 and the tooth tip of the motor shaft spline part 14A is not closed by the stop ring 42 for hole.

The lubricating oil passage 43 is disposed in the axial intermediate part of the coupling 38. The lubricating oil passage 43 is formed as a radial hole penetrating from the outer peripheral surface of the coupling 38 to the annular oil passage 41A of the stopper fitting section 41. The lubricating oil passage 43 configures part of a coupling section lubricating circuit 58. The coupling section lubricating circuit 58 supplies part of the lubricating oil L flowing in the lubricating oil circulation circuit 50 to the spline coupling section 39A between the motor shaft-side hole spline part 39 and the motor shaft spline part 14A and to the spline coupling section 40A between the rotation shaft-side hole spline part 40 and the rotation shaft spline part 15A.

That is, the after-mentioned lubricating oil circulation circuit 50 includes a main circuit composed of a circulation passage for supplying lubricating oil to the gear reduction mechanism 21, and the coupling section lubricating circuit 58 connected to the main circuit. The coupling section lubricating circuit 58 branches the lubricating oil flowing to the gear reduction mechanism 21 through the main circuit in the lubricating oil circulation circuit 50 to be supplied through the inside of the coupling 38 to a connecting part (spline coupling section 39A) between the motor shaft 14 and the coupling 38 and to a connecting part (spline coupling section 40A) between the rotation shaft 15 and the coupling 38. The lubricating oil passage 43 configures the coupling section lubricating circuit 58 together with a suction pipe 51, a lubricating oil pump 52, a delivery pipe 54, a branch joint 53, a coupling lubricating pipe 56, a supply oil passage 47 of the coupling 38, a stopper oil passage part 44G, a counterbore 44F, the annular oil passage 41A, the gap 38A, a discharge oil passage 48 and the like.

A stopper 44 as a positioning member is removably attached to the projection end 14B-side of the motor shaft 14 by using a stopper bolt 44A. As shown in FIG. 8, the stopper 44 is formed in a stepped cylindrical shape as a whole and is provided with a small-diameter fitting section 44B to be fitted in the stopper attaching hole 14C of the motor shaft 14 and a large-diameter fitting section 44C. The large-diameter fitting section 44C has an outer diameter dimension larger than the small-diameter fitting section 44B and is fitted in the tooth tip circle of the motor shaft-side hole spline part 39 of the coupling 38. The stopper 44 radially positions the coupling 38 relative to the motor shaft 14 when the large-diameter fitting section 44C is fitted in the tooth tip circle of the motor shaft-side hole spline part 39. A boundary part between the small-diameter fitting section 44B and the large-diameter fitting section 44C becomes an annular step part 44D, and the annular step part 44D axially faces the projection end 14B of the motor shaft 14.

A bolt through hole 44E is formed in the center part of the small-diameter fitting section 44B to penetrate therethrough axially. The bottomed counterbore 44F is formed in the large-diameter fitting section 44C concentrically with the bolt through hole 44E. The stopper 44 causes the small-diameter fitting section 44B to be fitted in the stopper attaching hole 14C of the motor shaft 14, and puts the stop ring 42 for hole between the annular step part 44D and the projection end 14B of the motor shaft 14. When the stopper bolt 44A inserted in the bolt through hole 44E is screwed into the bolt hole 14D of the motor shaft 14 in this state, the stopper 44 is attached to the motor shaft 14 and a head of the stopper bolt 44A is accommodated in the counterbore 44F.

In addition, the plurality of stopper oil passage parts 44G are formed in the stopper 44 to penetrate from an outer peripheral surface of the large-diameter fitting section 44C to the counterbore 44F. In a state where the motor shaft-side hole spline part 39 of the coupling 38 is spline-coupled to the motor shaft spline part 14A of the motor shaft 14, the plurality of stopper oil passage parts 44G are communicated via the annular oil passage 41A of the stopper fitting section 41 to the lubricating oil passage 43 of the coupling 38. Therefore, the counterbore 44F and the stopper oil passage part 44G configure an oil passage of the stopper 44. With this configuration, the lubricating oil L supplied to the lubricating oil passage 43 of the coupling 38 is distributed through the annular oil passage 41A of the coupling 38, and the counterbore 44F and the stopper oil passage parts 44G of the stopper 44 to the spline coupling section 39A between the motor shaft-side hole spline part 39 and the motor shaft spline part 14A and to the spline coupling section 40A between the rotation shaft-side hole spline part 40 and the rotation shaft spline part 15A.

The sleeve 45 is disposed between the axial one side of the coupling 38 and the motor shaft 14. The sleeve 45 is formed in a stepped cylindrical shape composed of a small-diameter cylindrical part 45A and a large-diameter cylindrical part 45B. An inner peripheral side of the sleeve 45 is fitted into the motor shaft 14 and an outer peripheral side of the small-diameter cylindrical part 45A is fitted into the sleeve fitting section 38B of the coupling 38. The sleeve 45 radially positions the axial one side of the coupling 38 relative to the motor shaft 14.

A coupling housing 46 is attached to the electric motor 13 to surround the outer peripheral side of the coupling 38. The coupling housing 46 is provided with a cylindrical part 46A to surround the outer peripheral side of the coupling 38 and a flange part 46B of which a diameter is enlarged from an axial one side of the cylindrical part 46A (electric motor 13-side), and the flange part 46B is attached to the electric motor 13 by using bolts 46C. On the other hand, a coupling fitting section 46D is disposed on an axial other side of the cylindrical part 46A and an inner peripheral surface of the coupling fitting section 46D is slidably fitted into the outer peripheral surface of the coupling 38 to suppress the misalignment of the coupling 38. In addition, an annular groove 46E is formed over an entire periphery on an inner peripheral surface of the coupling fitting section 46D.

The supply oil passage 47 positioned above the coupling 38 and the discharge oil passage 48 positioned under the coupling 38 are formed in the cylindrical part 46A of the coupling housing 46. One end 47A of the supply oil passage 47 opens to an outer peripheral surface of the cylindrical part 46A to be connected to an after-mentioned coupling lubricating pipe 56 configuring part of the lubricating oil circulation circuit 50. On the other hand, the other end 47B of the supply oil passage 47 is connected to the annular groove 46E formed on an inner peripheral surface of the coupling fitting section 46D and is communicated via the annular groove 46E with the lubricating oil passage 43 of the coupling 38. In addition, two seal rings 49 sandwiching the annular groove 46E axially are arranged on the inner peripheral surface of the coupling fitting section 46D. The two seal rings 49 seals the lubricating oil by an inner peripheral edge of each of the two seal rings 49 coming in slide contact with an outer peripheral surface of the coupling 38.

Next, an explanation will be made of a work procedure at the jointing of the motor shaft 14 and the rotation shaft 15 by using the coupling 38 by referring to FIG. 8.

First, the inner periphery of the sleeve 45 is fitted into the motor shaft 14 and the flange part 46B of the coupling housing 46 is attached to the electric motor 13 by using the bolts 46C. On the other hand, the large-diameter fitting section 44C of the stopper 44 is fitted into the inner peripheral surface of the stopper fitting section 41 disposed in the coupling 38. In addition, the stop ring 42 for hole is attached to the annular groove 38C of the coupling 38, and by causing the stop ring 42 for hole to abut on the annular step part 44D of the stopper 44, the stopper 44 is positioned in the axial direction of the coupling 38.

Next, the motor shaft-side hole spline part 39 of the coupling 38 is caused to be spline-coupled to the motor shaft spline part 14A of the motor shaft 14. In this state, the coupling 38 is inserted until the stop ring 42 for hole abuts on the projection end 14B of the motor shaft 14 and the sleeve fitting section 38B of the coupling 38 is fitted into the small-diameter cylindrical part 45A of the sleeve 45. In this way, in a state where the stop ring 42 for hole has abutted on the projection end 14B of the motor shaft 14, the stopper bolt 44A is inserted in the bolt through hole 44E of the stopper 44 from the inner peripheral side of the coupling 38 to be screwed into the bolt hole 14D of the motor shaft 14.

In this way, the sleeve fitting section 38B of the coupling 38 is fitted into the small-diameter cylindrical part 45A of the sleeve 45 and the tooth tip circle of the motor shaft-side hole spline part 39 disposed in the coupling 38 is fitted into the large-diameter fitting section 44C of the stopper 44. With this configuration, the coupling 38 is radially positioned (centered) relative to the motor shaft 14. In addition, the stop ring 42 for hole attached to the annular groove 38C of the coupling 38 abuts on the projection end 14B of the motor shaft 14 and the annular step part 44D of the stopper 44. With this configuration, the coupling 38 is radially positioned relative to the motor shaft 14.

In addition, the rotation shaft spline part 15A of the rotation shaft 15 is spline-coupled to the rotation shaft-side hole spline part 40 of the coupling 38 attached to the motor shaft 14, and the rotation shaft 15 is axially inserted into the coupling 38. With this configuration, as shown in FIG. 5 the motor shaft 14 and the rotation shaft 15 can be jointed by using the coupling 38.

In this state, the lubricating oil passage 43 of the coupling 38 opens to the annular groove 46E of the coupling housing 46 and the stopper oil passage part 44G of the stopper 44 opens to the annular oil passage 41A of the stopper fitting section 41 disposed in the coupling 38. In addition, as shown in FIG. 7 the gap 38A is formed between the tooth bottom of the motor shaft-side hole spline part 39 formed in the coupling 38 and the tooth tip of the motor shaft spline part 14A. Similarly, a gap (not shown) is formed also between the tooth bottom of the rotation shaft-side hole spline part 40 formed in the coupling 38 and the tooth tip of the rotation shaft spline part 15A. In this case, an outer diameter dimension of the stop ring 42 for hole is set to be smaller than the tooth tip circle diameter D2 of the motor shaft spline part 14A. Therefore, the gap 38A formed between the tooth bottom of the motor shaft-side hole spline part 39 and the tooth tip of the motor shaft spline part 14A is not closed by the stop ring 42 for hole.

The lubricating oil circulation circuit 50 is disposed in the inside of the spindle 12 and the axle housing 10. The main circuit of the lubricating oil circulation circuit 50 is configured of the suction pipe 51, the lubricating oil pump 52, the delivery pipe 54, a supply pipe 55 and the like and repeatedly supplies the lubricating oil L stored in the inside of the wheel attaching cylinder 17 to the gear reduction mechanism 21, the roller bearing 18, the bearing 16 and the like. The coupling section lubricating circuit 58 is connected to the lubricating oil circulation circuit 50. The coupling section lubricating circuit 58 branches the lubricating oil to be supplied to the gear reduction mechanism 21 from the lubricating oil circulation circuit 50 to be supplied through the inside of the coupling 38 to the coupling section (spline coupling section 39A) between the motor shaft 14 and the coupling 38 and to the coupling section (spline coupling section 40A) between the rotation shaft 15 and the coupling 38. In the present embodiment, part of the lubricating oil L flowing in the lubricating oil circulation circuit 50 is supplied to the spline coupling section 39A between the motor shaft-side hole spline part 39 and the motor shaft spline part 14A and to the spline coupling section 40A between the rotation shaft-side hole spline part 40 and the rotation shaft spline part 15A through the coupling lubricating pipe 56 configuring part of the coupling section lubricating circuit 58, the supply oil passage 47 of the coupling housing 46, the lubricating oil passage 43 of the coupling 38 and the like.

The suction pipe 51 is disposed within the spindle 12 and the axle housing 10. A longitudinal one side of the suction pipe 51 axially extends within the axle housing 10 and is connected to a suction port of the lubricating oil pump 52. A longitudinal other side of the suction pipe 51 is positioned under the rotation shaft 15 to axially extend within the spindle 12. A tip end 51A of the suction pipe 51 is bent in an L-letter shape and extends downward from the vicinity of the inner-side projection part 12G of the spindle 12 and is inserted in the radial hole 12H of the spindle 12. With this configuration, the tip end 51A of the suction pipe 51 is immersed in the lubricating oil L within the wheel attaching cylinder 17 and the lubricating oil pump 52 sucks up the lubricating oil L through the suction pipe 51.

The branch joint 53 is disposed in one of the plurality of motor attaching seatings 12E disposed in the spindle 12. The branch joint 53 is provided with a single inlet port and two outlet ports different in a flow quantity (none of them are shown), for example. The delivery pipe 54 establishes connection between a delivery port of the lubricating oil pump 52 and the inlet port of the branch joint 53. The lubricating oil L delivered from the lubricating oil pump 52 flows through the delivery pipe 54 into the branch joint 53 and is branched into two pathways by the supply pipe 55 and the coupling lubricating pipe 56 connected to the two outlet ports of the branch joint 53. That is, the branch joint 53 configures a diverging part for diverging the lubricating oil L delivered from the lubricating oil pump 52 into the supply pipe 55 and the coupling lubricating pipe 56. In addition, an oil cooler 57 is disposed in the middle of the delivery pipe 54.

The supply pipe 55 is disposed within the spindle 12. A longitudinal one side of the supply pipe 55 is connected to an outlet port in which a flow quantity is larger out of the two outlet ports of the branch joint 53. A longitudinal other side of the supply pipe 55 is positioned above the rotation shaft 15 and axially extends within the spindle 12. A tip end 55A of the supply pipe 55 is bent in an S-letter shape from the vicinity of the inner-side projection part 12G of the spindle 12 and extends along the rotation shaft 15 into the cylindrical projection part 33A of the second-stage carrier 33. With this configuration, in a state where most of the lubricating oil L delivered from the lubricating oil pump 52 is cooled by the oil cooler 57, the cooled lubricating oil L is supplied via the tip end 55A of the supply pipe 55 to the rotation shaft 15 to cool the rotation shaft 15 and scatter from the rotation shaft 15, whereby the bearing 16 and the like are lubricated.

The coupling lubricating pipe 56 is disposed within the spindle 12 together with the supply pipe 55. One end of the coupling lubricating pipe 56 is connected to an outlet port in which a flow quantity is smaller out of the two outlet ports of the branch joint 53. The other end 56A of the coupling lubricating pipe 56 is connected to One end 47A of the supply oil passage 47 formed in the coupling housing 46. With this configuration, part of the lubricating oil L delivered from the lubricating oil pump 52 is introduced from the coupling lubricating pipe 56 configuring part of the coupling section lubricating circuit 58 through the supply oil passage 47 in the coupling housing 46 to the lubricating oil passage 43 of the coupling 38.

The lubricating oil L introduced into the lubricating oil passage 43 is branched into a pathway indicated by an arrow F1 and a pathway indicated by an arrow F2 in FIG. 5. The lubricating oil L flowing in the pathway of the arrow F1 is supplied from the lubricating oil passage 43 through the annular oil passage 41A of the stopper fitting section 41 to the motor shaft-side hole spline part 39. In this case, the gap 38A is formed between the tooth bottom of the motor shaft-side hole spline part 39 and the tooth tip of the motor shaft spline part 14A. With this configuration, the lubricating oil L flows in the axial direction of the motor shaft-side hole spline part 39 through the gap 38A to lubricate the spline coupling section 39A between the motor shaft-side hole spline part 39 and the motor shaft spline part 14A.

On the other hand, the lubricating oil L flowing in the pathway of the arrow F2 is supplied from the lubricating oil passage 43 through the stopper oil passage part 44G and the counterbore 44F in the stopper 44 to the rotation shaft-side hole spline part 40. In this case, a gap (not shown) is formed between the tooth bottom of the rotation shaft-side hole spline part 40 and the tooth tip of the rotation shaft spline part 15A. With this configuration, the lubricating oil L flows in the axial direction of the rotation shaft-side hole spline part 40 through the gap to lubricate the spline coupling section 40A between the rotation shaft-side hole spline part 40 and the rotation shaft spline part 15A.

The traveling device 11 in the dump truck 1 according to the present embodiment has the configuration as described above, and next, an operation thereof will be explained.

First, when an operator which gets in the cab 5 of the dump truck 1 activates the engine 8, the hydraulic pump is driven and rotated, and electric power is generated by the power generator (none thereof are shown). At the time the dump truck 1 is driven to travel, the electric power is supplied from the power generator to the electric motor 13. Thereby the electric motor 13 is activated to rotate the rotation shaft 15.

The rotation of the rotation shaft 15 is decelerated by two states by the first-stage planetary gear reduction mechanism 22 and the second-stage planetary gear reduction mechanism 29 configuring the gear reduction mechanism 21, which is transmitted to the wheel attaching cylinder 17 and the wheel attaching cylinder 17 rotates with a large rotational toque. As a result, the left and right rear wheels 7 as drive wheels rotate integrally with the wheel attaching cylinder 17, making it possible to cause the dump truck 1 to travel.

At the operating of the traveling device 11, the lubricating oil L stored in the wheel attaching cylinder 17 is stirred by the planetary gears 24, 31 configuring the planetary gear reduction mechanisms 22, 29, and the like, which is supplied to engaging parts between gears, the roller bearing 18, the bearing 16 and the like. In addition, the lubricating oil L sequentially drops down to be collected to a lower side of the wheel attaching cylinder 17.

The lubricating oil L collected in the lower side of the wheel attaching cylinder 17 is sucked up from the tip end 51A of the suction pipe 51 by the lubricating oil pump 52, which is delivered to the delivery pipe 54. After the lubricating oil L delivered to the delivery pipe 54 is cooled by the oil cooler 57, the cooled lubricating oil L flows into the branch joint 53. Most of the lubricating oil L having flowed into the branch joint 53 is led to the supply pipe 55, which is then supplied through the tip end 55A of the supply pipe 55 to the rotation shaft 15. With this configuration, the rotation shaft 15 can be cooled by the lubricating oil L and the bearing 16 and the like can be lubricated by the lubricated oil L scattered from the rotation shaft 15.

The lubricating oil L led to the coupling lubricating pipe 56 from the branch joint 53 is introduced through the supply oil passage 47 of the coupling housing 46 to the lubricating oil passage 43 of the coupling 38. The lubricating oil L introduced to the lubricating oil passage 43 is branched into the pathway indicated by the arrow F1 and the pathway indicated by the arrow F2 in FIG. 5.

The lubricating oil L flowing in the pathway of the arrow F1 is supplied from the lubricating oil passage 43 through the annular oil passage 41A of the stopper fitting section 41 to the motor shaft-side hole spline part 39. In this case, the gap 38A is formed between the tooth bottom of the motor shaft-side hole spline part 39 and the tooth tip of the motor shaft spline part 14A. With this configuration, the lubricating oil L flows in the axial direction of the motor shaft-side hole spline part 39 through the gap 38A, making it possible to lubricate the spline coupling section 39A between the motor shaft-side hole spline part 39 and the motor shaft spline part 14A by the lubricating oil L. The remaining oil of the lubricating oil L supplied to the spline coupling section 39A between the motor shaft-side hole spline part 39 and the motor shaft spline part 14A flows down from the fitting section between the coupling 38 (sleeve fitting section 38B) and the sleeve 45 into the coupling housing 46 and is discharged through the discharge oil passage 48 to an exterior of the coupling housing 46 (inside the spindle 12). With this configuration, the lubricating oil L is prevented from leaking to the electric motor 13-side, thus making it possible to protect the electric motor 13.

On the other hand, the lubricating oil L flowing in the pathway of the arrow F2 is supplied from the lubricating oil passage 43 through the stopper oil passage part 44G and the counterbore 44F of the stopper 44 to the rotation shaft-side hole spline part 40. In this case, a gap (not shown) is formed between the tooth bottom of the rotation shaft-side hole spline part 40 and the tooth tip of the rotation shaft spline part 15A. With this configuration, the lubricating oil L flows in the axial direction of the rotation shaft-side hole spline part 40 through the gap, making it possible to lubricate the spline coupling section 40A between the rotation shaft-side hole spline part 40 and the rotation shaft spline part 15A. The remaining oil of the lubricating oil L supplied to the spline coupling section 40A between the rotation shaft-side hole spline part 40 and the rotation shaft spline part 15A is discharged to the outer peripheral surface of the rotation shaft 15 from the rotation shaft spline part 15A, and the discharged oil formed in a mist shape due to the rotation of the rotation shaft 15 scatters into the spindle 12 to lubricate the bearing 16 supporting the rotation shaft 15.

In this way, the traveling device 11 according to the present embodiment includes the coupling section lubricating circuit 58 for supplying part of the lubricating oil L circulating in the lubricating oil circulation circuit 50 to the lubricating oil passage 43 of the coupling 38. In the present embodiment, the coupling section lubricating circuit 58 includes the branch joint 53, the coupling lubricating pipe 56, the supply oil passage 47 in the coupling housing 46, the lubricating oil passage 43 of the coupling 38, the annular oil passage 41A between the coupling 38 and the stopper 44, the stopper oil passage part 44G and the counterbore 44F of the stopper 44, the gap 38A between the motor shaft spline part 14A and the motor shaft-side hole spline part 39, the gap between the rotation shaft spline part 15A and the rotation shaft-side hole spline part 40, the discharge oil passage 48 of the coupling housing 46, and the like. With this configuration, the spline coupling section 39A between the motor shaft-side hole spline part 39 of the coupling 38 and the motor shaft spline part 14A and the spline coupling section 40A between the rotation shaft-side hole spline part 40 and the rotation shaft spline part 15A can always appropriately be lubricated by the lubricating oil L.

In addition, by using part of the lubricating oil L circulating in the lubricating oil circulation circuit 50, even when abrasion powder is produced from the spline coupling section 39A between the coupling 38 and the motor shaft 14 or from the spline coupling section 40A between the coupling 38 and the rotation shaft 15, this abrasion powder can be discharged from the spline coupling sections 39A, 40A by the flow of the lubricating oil L. As a result, durability on the spline coupling section 39A between the coupling 38 and the motor shaft 14 or on the spline coupling section 40A between the coupling 38 and the rotation shaft 15 improves, making it possible to maintain highly accurate power transmission to the rotation shaft 15 from the motor shaft 14 over a long period of time.

Further, the traveling device 11 is provided with the coupling housing 46 that rotatably holds the coupling 38, and the motor shaft 14, the rotation shaft 15, the coupling 38, the coupling housing 46 and the like are arranged on the inner periphery of the spindle 12 to be capable of being disassembled and assembled. As a result, the workability at the time of performing the maintenance to the motor shaft 14, the rotation shaft 15, the coupling 38 and the like can improve and the entirety of the traveling device 11 can be downsized.

In this way, the traveling device 11 is provided with: the cylindrical spindle 12 that is disposed on the vehicle body 2 in the wheeled vehicle and rotatably supports the wheel attaching cylinder 17 to which the wheel 7 is attached; the electric motor 13 attached to the spindle 12; the motor shaft 14 that projects from the electric motor 13 to output the rotation of the electric motor 13; the rotation shaft 15 that is disposed in such a manner as to axially extend on the inner peripheral side of the spindle 12 and to which the rotation of the motor shaft 14 is transmitted; the gear reduction mechanism 21 that decelerates the rotation of the rotation shaft 15 and transmits the decelerated rotation to the wheel attaching cylinder 17; the lubricating oil circulation circuit 50 for supplying the lubricating oil L to the gear reduction mechanism 21, and the coupling 38 for the joint between the motor shaft 14 and the rotation shaft 15, characterized by including the coupling section lubricating circuit 58 for supplying, the part of the lubricating oil L produced by split-flowing the lubricating oil L to be supplied to the gear reduction mechanism 21 from the lubricating oil circulation circuit 50, through the inside of the coupling 38 to the coupling section (spline coupling section 39A) between the motor shaft 14 and the coupling 38.

According to this configuration, the part of the lubricating oil L flowing in the lubricating oil circulation circuit 50 is supplied through the lubricating oil passage 43 of the coupling 38 to the spline coupling section 39A between the coupling 38 and the motor shaft 14 by the coupling section lubricating circuit 58. With this configuration, the spline coupling section 39A between the coupling 38 and the motor shaft 14 can always appropriately be lubricated by the lubricating oil L and the rotation of the motor shaft 14 can accurately be transmitted to the coupling 38.

In the embodiment, the motor shaft 14 is provided with the motor shaft spline part 14A disposed on the outer periphery, the rotation shaft 15 is provided with the rotation shaft spline part 15A disposed on the outer periphery, the coupling 38 is provided with the motor shaft-side hole spline part 39 that is located on the axial one side to be spline-coupled to the motor shaft spline part 14A, and is provided with the rotation shaft-side hole spline part 40 that is located on the axial other side to be spline-coupled to the rotation shaft spline part 15A, and the coupling section lubricating circuit 58 is provided with the lubricating oil passage 43 that is located on the axial intermediate part of the coupling 38 and supplies the lubricating oil L to the motor shaft-side hole spline part 39 and the rotation shaft-side hole spline part 40 from the outer periphery of the coupling 38.

According to this configuration, the lubricating oil L is supplied through the lubricating oil passage 43 to the spline coupling section 39A between the motor shaft spline part 14A and the motor shaft-side hole spline part 39 and can be supplied also to the spline coupling section 40A between the rotation shaft spline part 15A and the rotation shaft-side hole spline part 40. As a result, the spline coupling sections 39A, 40A between the motor shaft 14 and the rotation shaft 15, and the coupling 38 can always appropriately be lubricated by the lubricating oil L and the highly accurate power transmission from the motor shaft 14 to the rotation shaft 15 can be maintained over a long period of time.

In the embodiment, the cylindrical coupling housing 46, in which the coupling fitting section 46D slidably fitted on the outer peripheral surface of the coupling 38 is formed, is disposed in the electric motor 13, the coupling section lubricating circuit 58 is provided with the supply oil passage 47 that is disposed in the coupling housing 46 and has One end 47A connected to the lubricating oil circulation circuit 50 and the other end 47B communicated with the lubricating oil passage 43 of the coupling 38, and the discharge oil passage 48 for discharging the lubricating oil L supplied through the supply oil passage 47 to the motor shaft-side hole spline part 39 and the rotation shaft-side hole spline part 40 to an exterior of the coupling housing 46.

According to this configuration, the misalignment of the coupling 38 can be suppressed by the outer peripheral surface of the coupling 38 being fitted in the coupling fitting section 46D of the coupling housing 46 to suppress the misalignment of the rotation shaft 15 relative to the motor shaft 14. In addition, part of the lubricating oil L circulating in the lubricating oil circulation circuit 50 is led to the lubricating oil passage 43 of the coupling 38 from the supply oil passage 47 in the coupling housing 46 by the coupling section lubricating circuit 58 and can certainly be supplied to the spline coupling sections 39A, 40A between the motor shaft 14 and the rotation shaft 15, and the coupling 38. With this configuration, the spline coupling sections 39A, 40A can appropriately be lubricated by using the lubricating oil L circulating in the lubricating oil circulation circuit 50. Further, the extra oil of the lubricating oil L supplied to the spline coupling sections 39A, 40A between the motor shaft 14 and the rotation shaft 15, and the coupling 38 can be discharged through the discharge oil passage 48 to an exterior of the coupling housing 46. With this configuration, the extra lubricating oil L can be prevented from leaking to the electric motor 13-side to protect the electric motor 13.

In the embodiment, the stopper 44 for positioning the coupling 38 relative to the motor shaft 14 is removably disposed in the projection end 14B of the motor shaft 14, and the large-diameter fitting section 44C for positioning the coupling 38 in the radial direction of the motor shaft 14 by being fitted in the tooth tip circle of the motor shaft-side hole spline part 39 and the oil passage part (counterbore 44F and stopper oil passage part 44G) as the coupling section lubricating circuit 58 leading the lubricating oil L supplied to the lubricating oil passage 43 to the motor shaft-side hole spline part 39 and the rotation shaft-side hole spline part 40 are arranged in the stopper 44. According to this configuration, in a state where the motor shaft 14 and the rotation shaft 15 are jointed by the coupling 38, the lubricating oil L supplied to the lubricating oil passage 43 in the coupling 38 can be distributed through the counterbore 44F and the stopper oil passage part 44G to the spline coupling section 39A between the motor shaft-side hole spline part 39 and the motor shaft spline part 14A and to the spline coupling section 40A between the rotation shaft-side hole spline part 40 and the rotation shaft spline part 15A.

In the embodiment, the gap 38A is formed as the coupling section lubricating circuit 58 between the tooth tip of the motor shaft spline part 14A and the tooth bottom of the motor shaft-side hole spline part 39, the coupling section lubricating circuit 58 supplying the lubricating oil L supplied to the lubricating oil passage 43 to the spline coupling section 39A between the motor shaft spline part 14A and the motor shaft-side hole spline part 39. The stop ring 42 for hole is disposed on the inner peripheral side of the motor shaft-side hole spline part 39, the stop ring 42 for hole axially positioning the coupling 38 relative to the motor shaft 14 by being held between the projection end 14B of the motor shaft 14 and the stopper 44. The outer diameter dimension of the stop ring 42 for hole is set to be smaller than the tooth tip circle diameter of the motor shaft spline part 14A. According to this configuration, in a state of axially positioning the coupling 38 relative to the motor shaft 14 by the stop ring 42 for hole, the gap 38A formed between the tooth bottom of the motor shaft-side hole spline part 39 and the tooth tip of the motor shaft spline part 14A cannot be closed by the stop ring 42 for hole. Therefore, it is possible to appropriately supply the lubricating oil L supplied to the lubricating oil passage 43 to the spline coupling section 39A between the motor shaft spline part 14A and the motor shaft-side hole spline part 39.

It should be noted that in the embodiment, a case of using the stop ring 42 for hole for axially positioning the coupling 38 relative to the motor shaft 14 is shown as an example. However, the present invention is not limited thereto, but the coupling 38 may be bolted to the motor shaft 14 by screwing a bolt inserted from the outer peripheral side of the coupling 38 into the motor shaft 14, for example.

In addition, in the embodiment there is shown as an example the configuration of positioning the coupling 38 in a radial direction of the motor shaft 14 by fitting the large-diameter fitting section 44C of the stopper 44 in the tooth tip circle of the motor shaft-side hole spline part 39. However, the present invention is not limited thereto, but for example, the coupling 38 may radially be positioned by fitting the stopper fitting section 41 disposed in the coupling 38 in the large-diameter fitting section 44C of the stopper 44.

Further, in the embodiment, the dump truck 1 of a rear-wheel drive type is explained as an example. However, the present invention is not limited thereto, but the present invention may be applied to a dump truck of a front-wheel drive type or a four-wheel drive type driving front and rear wheels together.

DESCRIPTION OF REFERENCE NUMERALS

1: DUMP TRUCK
2: VEHICLE BODY
7: REAR WHEEL (VEHICLE WHEEL)
11: TRAVELING DEVICE
12: SPINDLE
13: ELECTRIC MOTOR
14: MOTOR SHAFT
14A: MOTOR SHAFT SPLINE PART
14B: PROJECTION END
15: ROTATION SHAFT
15A: ROTATION SHAFT SPLINE PART
17: WHEEL ATTACHING CYLINDER
21: GEAR REDUCTION MECHANISM
38: COUPLING
38A: GAP
39: MOTOR SHAFT-SIDE HOLE SPLINE PART
39A, 40A: SPLINE COUPLING SECTION (COUPLING SECTION)
40: ROTATION SHAFT-SIDE HOLE SPLINE PART
42: STOP RING FOR HOLE
43: LUBRICATING OIL PASSAGE
44: STOPPER (POSITIONING MEMBER)
44C: LARGE-DIAMETER FITTING SECTION (FITTING SECTION)
44F: COUNTERBORE (OIL PASSAGE PART)
44G: STOPPER OIL PASSAGE PART (OIL PASSAGE PART)
46: COUPLING HOUSING
46D: COUPLING FITTING SECTION (FITTING SECTION)
47: SUPPLY OIL PASSAGE
47A: ONE END
47B: OTHER END
48: DISCHARGE OIL PASSAGE
50: LUBRICATING OIL CIRCULATION CIRCUIT
58: COUPLING SECTION LUBRICATING CIRCUIT

The invention claimed is:

1. A traveling device for wheeled vehicle comprising:

a cylindrical spindle that is disposed on a vehicle body in a wheeled vehicle and rotatably supports a wheel attaching cylinder to which a wheel is attached;

an electric motor attached to the spindle;

a motor shaft that projects from the electric motor to output rotation of the electric motor;

a rotation shaft that is disposed in such a manner as to axially extend on an inner peripheral side of the spindle and to which rotation of the motor shaft is transmitted;

a gear reduction mechanism that decelerates the rotation of the rotation shaft and transmits the decelerated rotation to the wheel attaching cylinder;

a lubricating oil circulation circuit for supplying lubricating oil to the gear reduction mechanism;

a coupling for a joint between the motor shaft and the rotation shaft; and a coupling section lubricating circuit for supplying, a part of the lubricating oil produced by split-flowing the lubricating oil to be supplied to the gear reduction mechanism from the lubricating oil circulation circuit, through the inside of the coupling to a coupling section between the motor shaft and the coupling, wherein the motor shaft is provided with a motor shaft spline part disposed on the outer periphery, the rotation shaft is provided with a rotation shaft spline part disposed on the outer periphery; the coupling is provided with a motor shaft-side hole spline part that is located on an axial one side to be spline-coupled to the motor shaft spline part and a rotation shaft-side hole spline part that is located on an axial other side to be spline-coupled to the rotation shaft spline part; and the coupling section lubricating circuit is provided with a lubricating oil passage that is located on an axial intermediate part of the coupling and supplies the lubricating oil to the motor shaft-side hole spline part and the rotation shaft-side hole spline part from the outer periphery of the coupling, the traveling device further comprises:

a positioning member removably disposed in a projection end of the motor shaft, the positioning member positioning the coupling relative to the motor shaft, wherein the positioning member is provided with:

a fitting section for positioning the coupling in a radial direction of the motor shaft by being fitted in a tooth tip circle of the motor shaft-side hole spline part; and an oil passage part as the coupling section lubricating circuit leading the lubricating oil supplied to the lubricating oil passage to the motor shaft-side hole spline part and the rotation shaft-side hole spline part.

2. The traveling device for wheeled vehicle according to claim 1, further comprising:

a cylindrical coupling housing disposed in the electric motor, the cylindrical coupling housing being provided with a fitting section formed to be slidably fitted on an outer peripheral surface of the coupling, wherein the coupling section lubricating circuit is provided with:

a supply oil passage that is disposed in the coupling housing and has one end connected to the lubricating oil circulation circuit and the other end communicated with the lubricating oil passage of the coupling; and a discharge oil passage for discharging the lubricating oil supplied through the supply oil passage to the motor shaft-side hole spline part and the rotation shaft-side hole spline part to an exterior of the coupling housing.

3. The traveling device for wheeled vehicle according to claim 1, further comprising:

a gap formed as the coupling section lubricating circuit between a tooth tip of the motor shaft spline part and a tooth bottom of the motor shaft-side hole spline part, wherein the coupling section lubricating circuit supplies the lubricating oil supplied to the lubricating oil passage to a spline coupling section between the motor shaft spline part and the motor shaft-side hole spline part; and a stop ring for hole disposed on an inner peripheral side of the motor shaft-side hole spline part, the stop ring for hole axially positioning the coupling relative to the motor shaft by being held between the projection end of the motor shaft and the positioning member, wherein an outer diameter dimension of the stop ring for hole is set to be smaller than the tooth tip circle diameter of the motor shaft spline part.

* * * * *